United States Patent Office 3,333,783
Patented Aug. 1, 1967

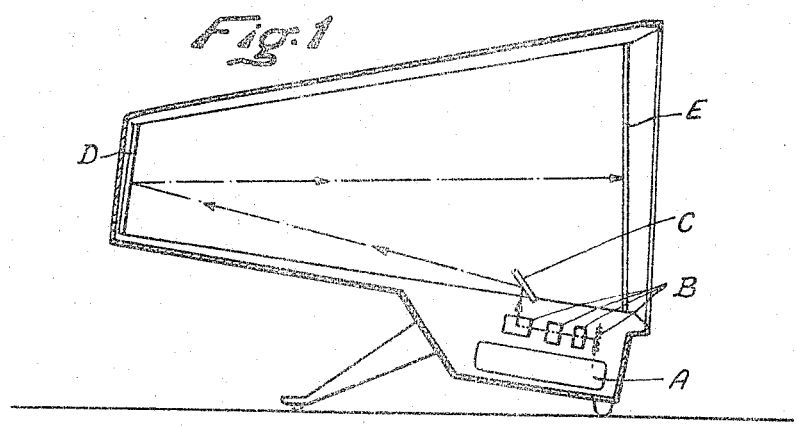
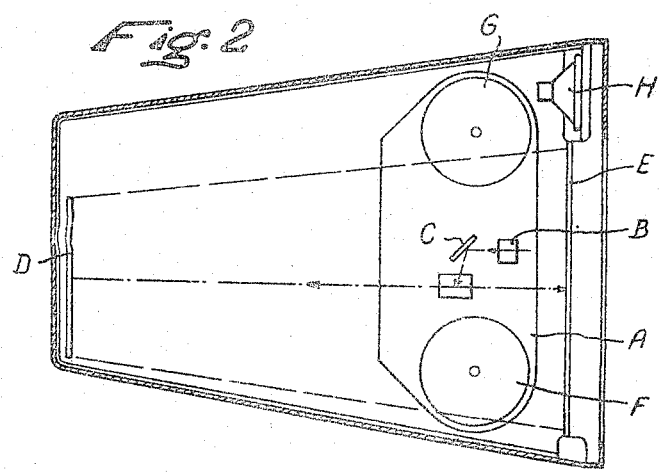
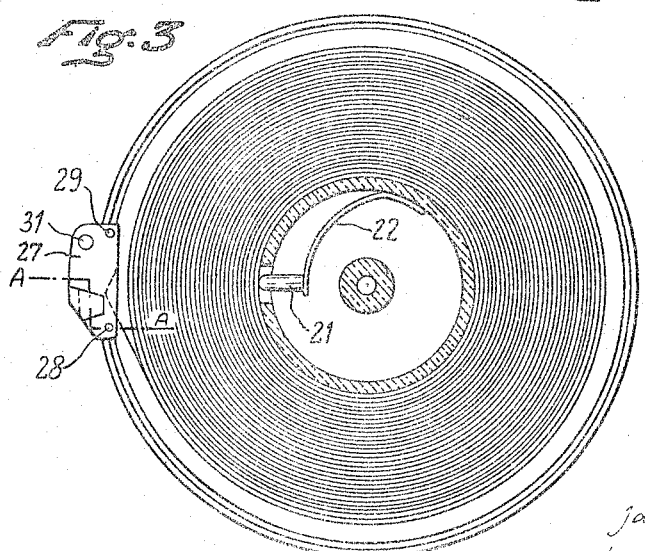

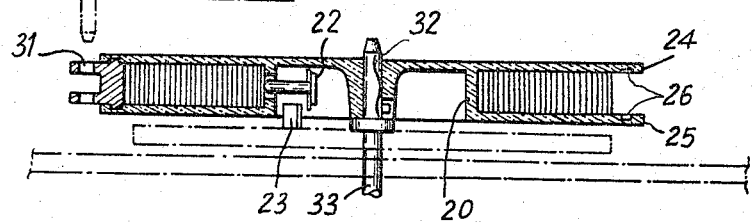
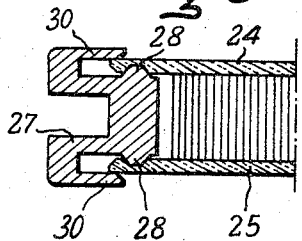
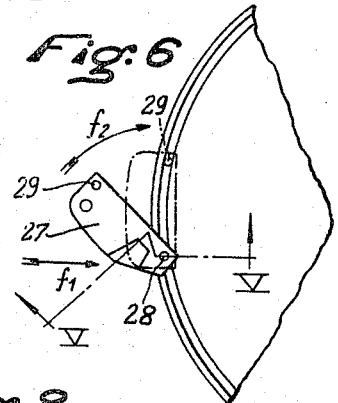
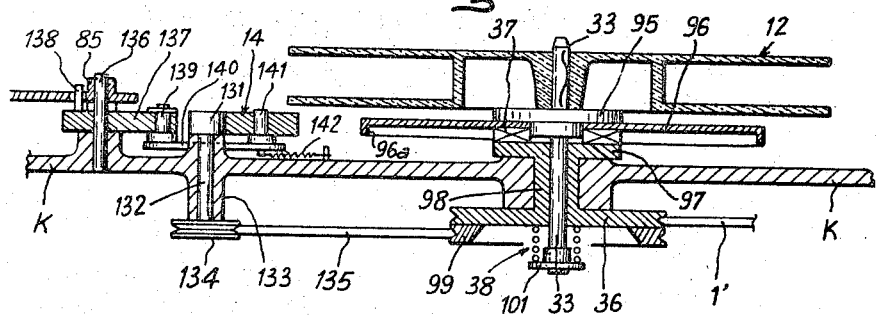
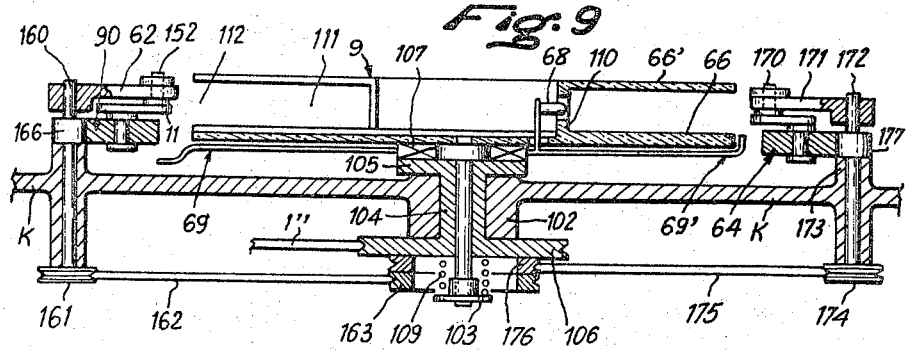

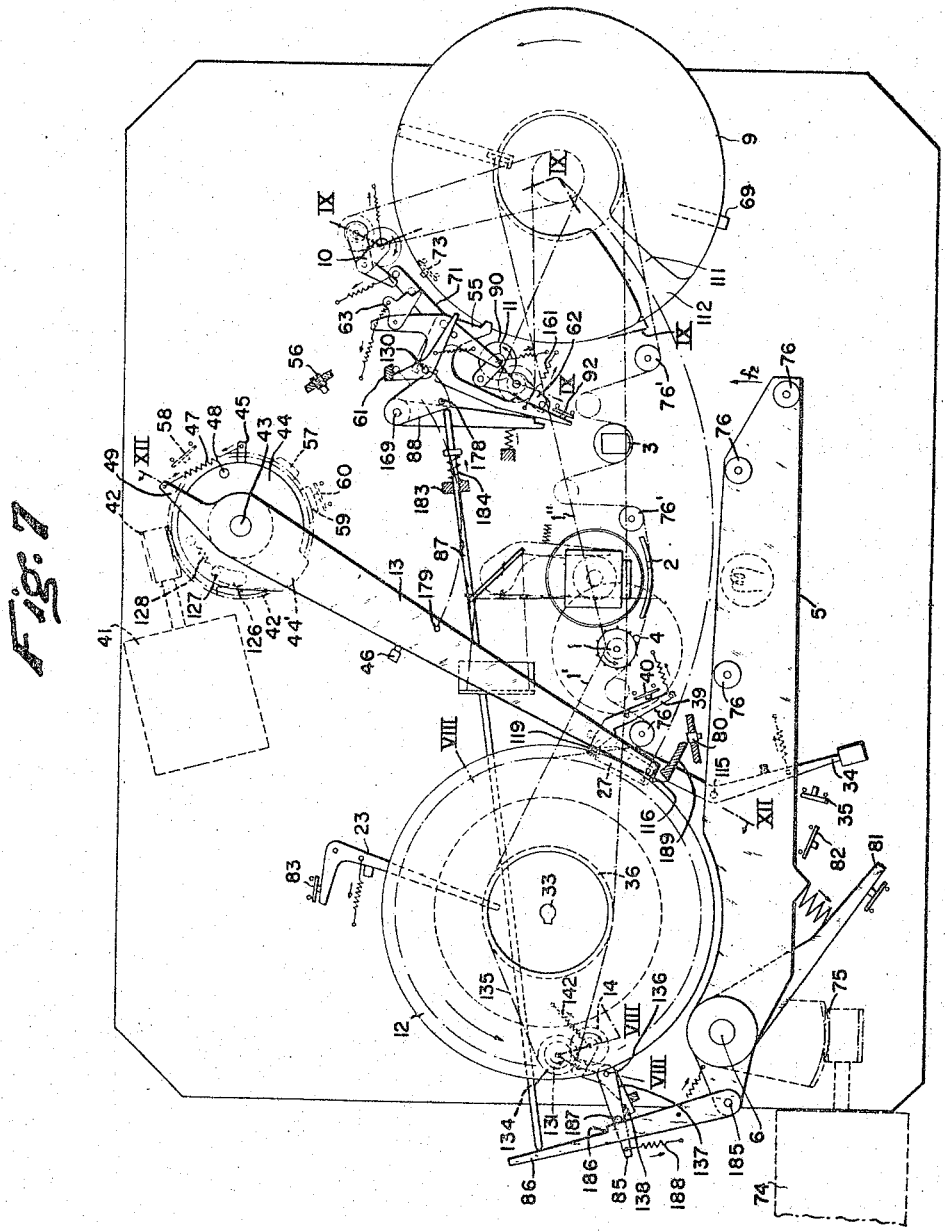

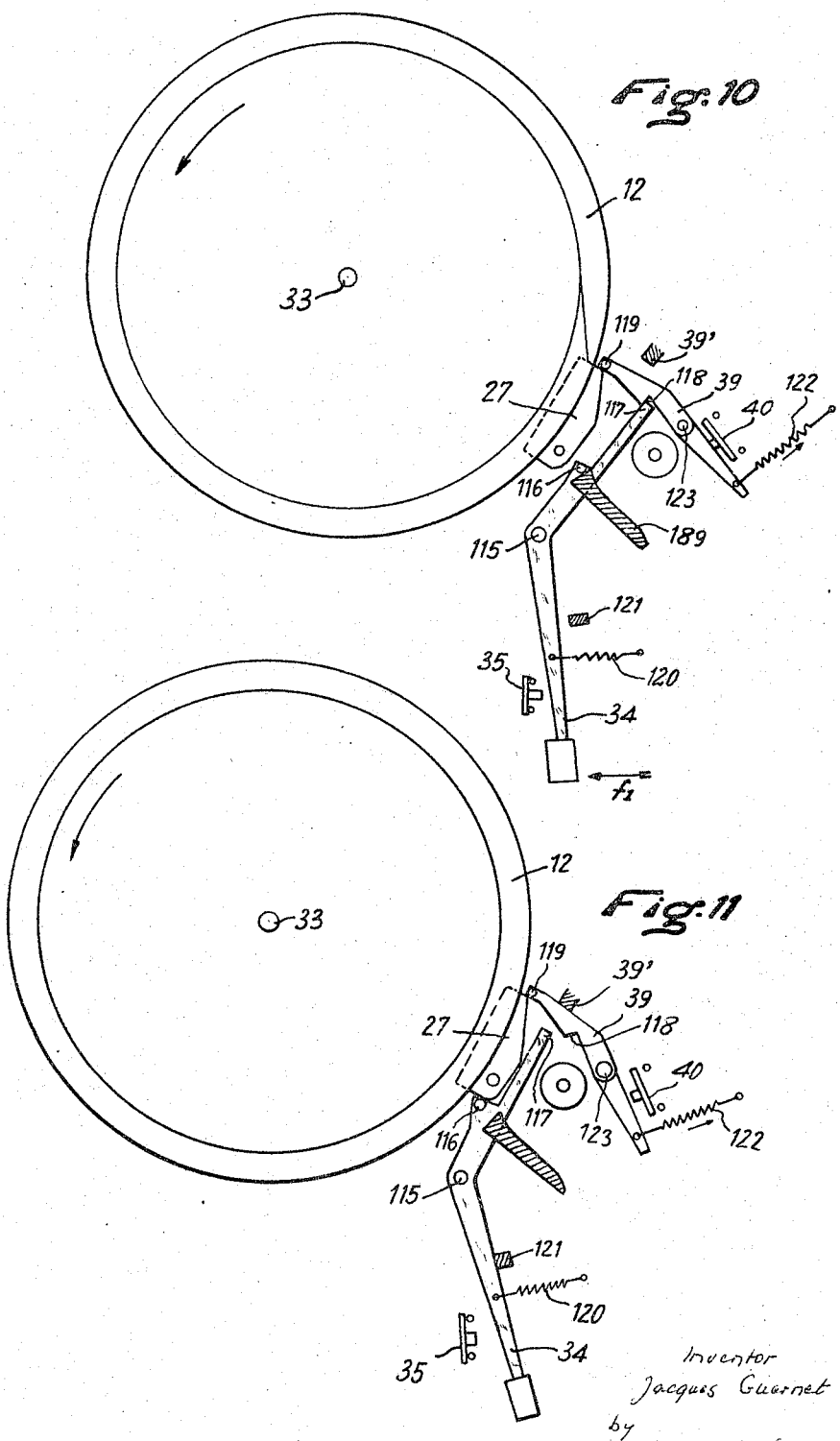

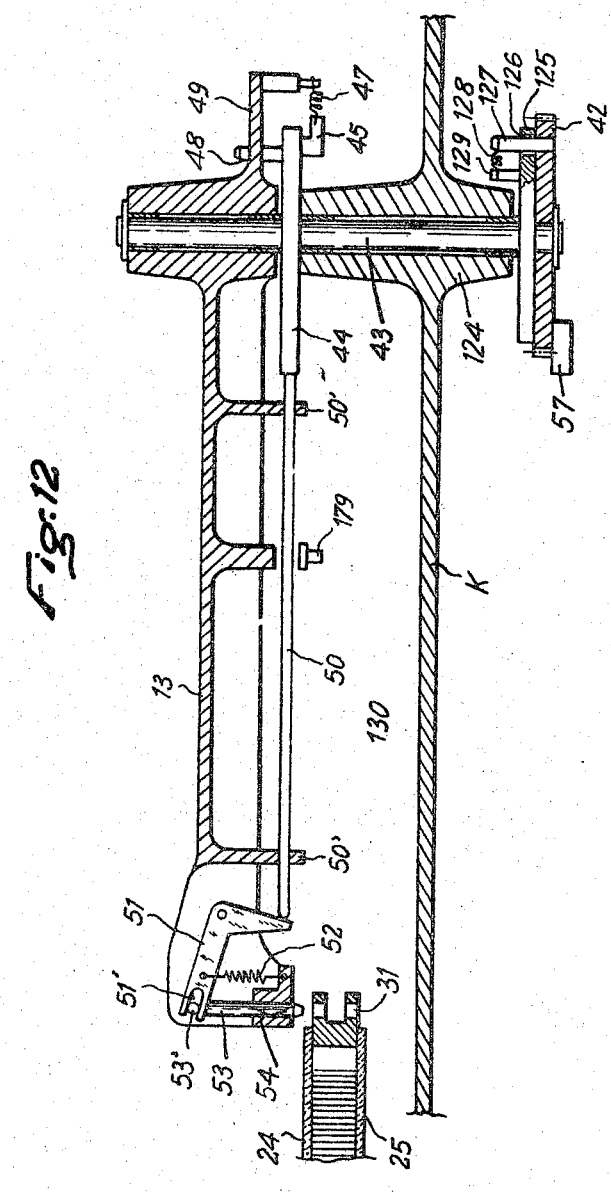

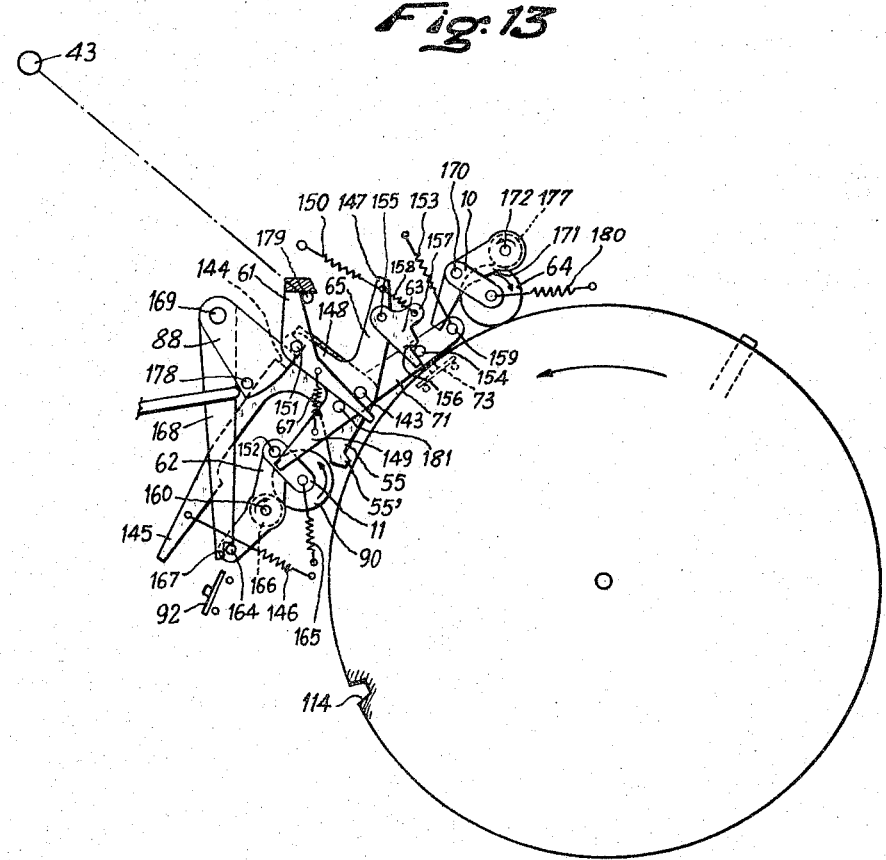

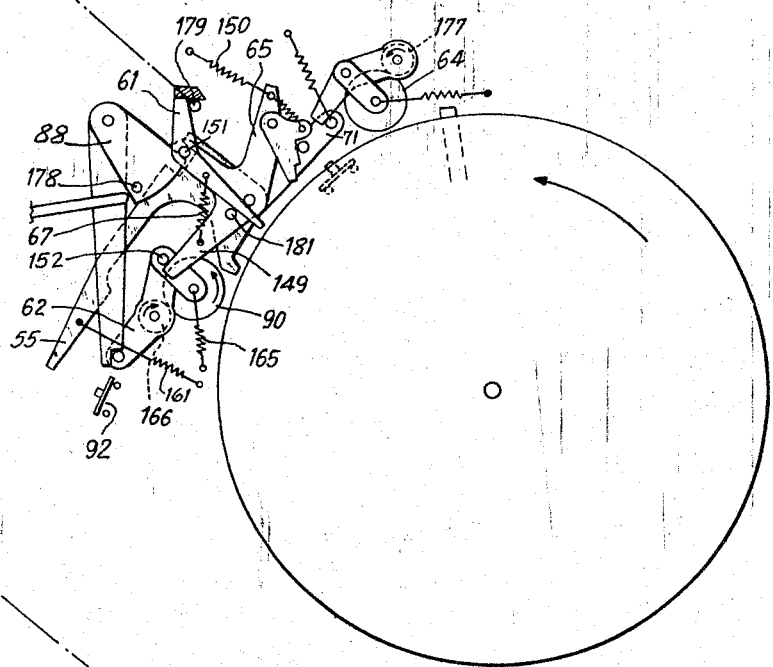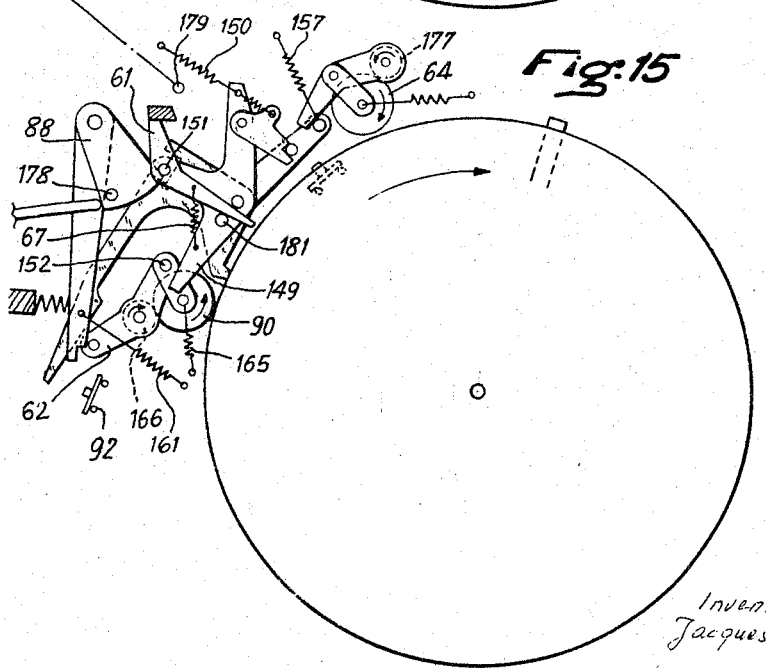

3,333,783
AUTOMATIC FILM THREADING AND REWINDING APPARATUS
Jacques Guernet, Courbevoie, France, assignor to Compagnie d'Applications Mecaniques à l'Electronique au Cinema et à l'Atomistique (CAMECA), Paris, France, a company of France
Filed July 30, 1964, Ser. No. 386,146
Claims priority, application France, Aug. 6, 1963, 943,939
8 Claims. (Cl. 242—55.12)

The present invention relates to the automatic projection of films and in particular to a projection apparatus in which the various operations necessary for the projection and for the rewinding of the film after projection are effected automatically, the only operation carried out by the user being the placing of the spool to be projected on its support.

It is known to make apparatus in which the end of a band, wound on a supply bobbin or spool, is transferred to the core of a single take-up spool, by means of an oscillatory arm having at its end hooking means which engage in complementary means at the end of the said band. The arm causing rotation by carrying with it the end of the band and transporting it to the core of the take-up spool and bringing it back to the supply spool when a recording on the band has been reproduced, the movement of the spools having been reversed in order to re-wind the film on its supply spool.

Such arrangements have been made, in particular, in automatic pianos having perforated bands wound on spools and passing in front of pneumatic readers actuating the keys of the piano. Such arrangements were then applied to cinematography, the readers then being optical, magnetic or of other known types.

The known arrangements do not give complete satisfaction, either because of their complexity, or because the transfer of the band is effected roughly which can lead to breakages, or, above all, because in most cases the band has to be brought to a particular location in order that the transfer arm may hook it.

The present invention is concerned with projectors such that the only operation effected by the used is to place the spool of film to be projected on to its spindle without having to take account of the position of the end of the film, the various operations of positioning, projecting and rewinding the film being affected automatically.

The arrangement comprises all or some of the following features taken together or separately.

(1) Film spool to serve as the supply spool to a projector having at its centre a hole to enable it to be disposed on an appropriate spindle in the projector and a clip fixed to the free end of the film wound on the spool, this clip and the circular flanges of the spool being provided with means enabling the clip to be hooked on to the said flanges at any point in their periphery and the clip being provided with means allowing a transfer device to seize the clip and to detach it from the flanges of the spool, thus carrying with it the free end of the film which is wound on it.

(2) The present invention also comprises:

(a) An automatic projector comprising a supply spool according to the preceding paragraph, a single take-up spool the upper flange of which has a notch in it; and transfer means through which the clip carried by the supply spool is automatically stopped in a predetermined position and then disconnected from the flanges of the supply spool for transportation to the centre of the take-up spool while passing through the notch in the upper flange of the said take-up spool, the latter being stopped automatically in such a position that its notch is in the path taken by the transfer means.

(b) An automatic projector according to paragraph (a) having also auxiliary driving means for the supply and take-up spools through which, on the one hand, the take-up spool is rotated at slow speed through one revolution during which the lead-in part of the film is wound on its barrel and is subsequently, at the end of the re-winding operation, rotated at slow speed through one revolution in the reverse direction during which the lead-in part of the film which was wound during the preceding operation is unwound; and on the other hand, the supply spool is rotated in its normal driving direction but at higher speed until the take-up spool has only one turn of film left wound on its barrel.

(c) the automatic projector also comprises in combination with the preceding means, presentation devices for the film comprising a movable arm carrying pressure rollers, the movement of which arm brings the film, tensioned between the take-up spool and the supply spool, into contact with a toothed feed device for driving the film, and present it to an image passage and a sound reading cell; this movement of the arm then causing the starting up of the projecting means and the return movement of the arm, when the film has been projected causing initiation of the film rewinding operations.

By way of example and to make the description more clear, reference is made to the accompanying drawings in which:

FIGURE 1 is a diagrammatic vertical cross-sectional view of a projector having automatic projection means in accordance with the invention, FIGURE 2 is a horizontal diagrammatic cross-sectional view of the device of FIGURE 1, FIGURE 3 is a plan view, partly in section, of a spool or supply reel in accordance with the invention, FIGURE 4 is a vertical cross-sectional view of the spool of FIGURE 3, FIGURE 5 is an enlarged transverse cross-sectional view of a portion of the spool of FIG. 4, the view being taken on the plane of the line V—V of FIGURE 6, FIGURE 6 is a fragmentary plan view of the spool and clip, of FIGURE 3, FIGURE 7 is a general plan view, partly in section, showing one mode of construction of a device in accordance with the invention, FIGURE 8 is a vertical cross sectional view of the supply spool of FIGURE 7 taken on the planes of the lines VIII—VIII of that figure, FIGURE 9 is a vertical cross-sectional view taken on the planes of the lines IX—IX of FIGURE 7 showing a take-up spool in accordance with the invention, FIGURE 10 is a detailed plan view of the device of FIGURE 7 showing a first position of the clip arresting device, FIGURE 11 is a view similar to FIGURE 10 but showing a second position of the clip arresting device, FIGURE 12 is a sectional view, taken along the plane of line XII—XII of FIGURE 7, showing details of the transfer arm, FIGURE 13 is a sectional detailed view on the plane of lines XIII—XIII of FIGURE 7 showing the slow driving means for the take-up spool in the unwinding position, FIGURE 14 is a view similar to FIGURE 13 showing the said means in the projection position, and FIGURE 15 is a view similar to FIGURE 13 showing the said means at the end of re-winding position.

Referring to FIGURES 1 and 2 it will be seen that the arrangement comprises a base A on which is mounted a driving mechanism optical projection means such as lamps, lenses, screens or other parts B, a first reflection mirror C (which can be a prism), a second reflection mirror D and a translucent projection screen E.

On the base A are disposed a supply spool F and a take-up spool G and the device comprises also a loud speaker H.

FIGURES 3, 4, 5 and 6, show one form of construction of a supply spool in accordance with the invention.

This spool has a central barrel 20 on which the film is wound. Within the central barrel 20 there is a peg 21 carried by a resilient strip 22. The lead-in portion of the film has openings through which the peg 21 passes, the latter being pressed in when a part of the film or its lead-in having no corresponding opening is wound on the barrel 20; when the peg 21 projects through the barrel 20, the strip 22 actuates lever 23 carried by the base A (FIG. 4), this lever actuating electrical switch means the function of which will be described in detail further on.

The film is held laterally by two circular flanges or cheeks 24 and 25, each of these two cheeks having a circular groove 26 formed in its inner face.

The free end of the film is fixed, by any suitable means such as an adhesive, to a clip 27 which has at its base two projections 28 and two projections 29. This clip 27 has also two wings 30 which are for the purpose of holding the cheeks 24 and 25 when the clip 27 is fixed thereto.

The hooking of this clip 27 is effected in three operations (FIGURE 6); the clip having first been engaged at right angles to the cheeks 24 and 25 (arrow f1), the projections 28 force these cheeks apart by bending them and engage in the grooves 26; the clip 27 is then rocked in the direction of the arrow f2 and the wings 30 lock the cheeks 24 and 25 in the region of the projections 28; the projections 29 in their turn are engaged between the cheeks 24 and 25 and force the cheeks 24 and 25 apart although they are well held by the wings 30, and enter the grooves 26.

As the grooves 26 extend all around the cheeks 24 and 25, it will be seen that the clip 27 can be fastened at any desired point of the cheeks 24 and 25. The supply spool also has a central opening by means of which it is placed on a driving spindle of a projector, this spindle being shown at 33 in FIGURE 4, the spindle 33 comprising a leaf spring 32 engaging in a corresponding cut-out in the hub of the supply spool so as to fix the supply spool to the spindle 33.

FIGURE 7 is a plan view of the support plate or base A and driving mechanism of an automatic projector in accordance with the present invention, the supply spool F of FIGURES 1 and 2 described in connection with FIGURES 3–6 being designated in FIGURE 7 by the reference 12 and the take-up spool G by the reference 9.

The projector comprises: a circular plate on which is disposed a supply spool 12 similar to that described above and a take-up spool 9.

These two spools are driven by a driving motor of known type which to simplify the figures has not been shown. The shaft of the motor drives a pulley 1 which through two transmission elements such as the belts 1' (FIG. 8) and 1" (FIG. 9) drives the two spool driving spindles.

The supply spool 12 (FIGURE 8) is mounted on a vertical spindle 33 and rests on a disc 95 fixed to a plate 96. The plate 96 is connected to the cheek 97 of a sleeve 98 carrying a pulley 36 through a friction clutch formed of a friction disc 37 and a spring 38, which presses on the one hand against the pulley 36 and on the other hand against a nut 101 carried by the spindle 33. The pulley 36 receives the driving belt 1' so that when the driving motor is started up the plate 96 is driven by the motor through the friction clutch 37 the pressure of which is determined by the tension of the spring 38. In the example shown in FIGURE 7, the driving pulley 1 turns in the counterclockwise direction and therefore the pulley 36 and the supply spool 12 are driven by the friction clutch 37 in the film winding direction.

The take-up spool 9 (FIGURE 9) has a lower cheek 66 mounted on a spindle 102 having at its lower end a nut 103. The spindle 102 is introduced into the central bore of a sleeve 104 analogous to the sleeve 98 and having, like the latter, a cheek 105 and a pulley 106 receiving the belt 1'. A friction disc 107 is disposed between the cheek 105 and the cheek 66 so that when the driving motor is started up the lower cheek 66 of the take-up spool 9 is driven through the friction disc 107 the pressure of which is determined by the tension of the spring 109 pressing against the nut 103 and the pulley 106. In the example shown in FIGURE 7, as the driving pulley 1 turns in the counterclockwise direction, the pulley 106 and the spool 9 are driven by the friction disc 107 in the same direction.

The sleeves 98 and 104 are carried by the frame K of the base A.

The spool 9 also has a barrel 110 on which the film will be wound during projection and an upper cheek 66' connected to the barrel, this barrel and the upper cheek forming a radial slot 111 slightly wider at the entry end 112 and the minimum thickness of which is substantially equal to or slightly greater than the lateral thickness of the clip 27.

As in the case of the supply spool 12, there is disposed within the central barrel a projection 68 carried by a bar 69. This projection 68 projects through openings formed in the lead-in or other portion of the film which is wound on the said barrel 110. When the lead-in portion of the film no longer has any opening in it, the projection 68 is pressed back, the movement of the projection in one direction or the other being transmitted to the bar 69 which actuates electrical switch means the purpose of which will be described in detail further on.

The lower cheek 66 of the spool 9 has also at a point in its periphery a cut-out in the form of a notch 114 (FIG. 13) constituting a locking notch for the said spool.

Also on the frame K are means for catching the clip 27, when the supply spool is started up, for stopping the supply spool in a predetermined position while causing the friction disc 37 to slip.

These means include a lever 34 (FIGURES 10 and 11) carried by a pin 115 fixed to the frame K, this lever 34 having a finger 116 and a claw 117. The claw 117 of the lever 34 rests in a notch 118 in a lever 39 carried by a pin 123 fixed to the frame K, this lever having at one of its ends a finger 119. The lever 34 is urged towards a stop 121 carried by the frame K by a spring 120 and the lever 39 is biassed by a spring 122, its movement being also limited by a stop 39' carried by the frame K.

Switches 35 and 40 carried by the frame K are actuated by the lever 34 and the lever 39 when they turn on their pins 115 and 123.

The supply spool 12 on which the film to be projected is wound is mounted on its spindle 33 without it being necessary to place its end held by the clip 27 in any particular position. The lever 34 is then displaced in the direction of the arrow f1 which actuates the switch 35 which starts up the motor driving the pulley 1. The pulley drives the spool 12 in the counterclockwise direction through the belt 1' and the friction disc 37.

The spool 12 turns until the clip 27 strikes the finger 119 of the lever 39 (FIG. 10) causing the latter to rock clockwise and bringing it against its stop 39' (FIG. 11), which liberates the claw 117 of the lever 34. The latter, being biassed by the spring 120, rocks and comes up against its stop 121.

In this position, the finger 116 of the lever 34 arrives behind the clip 27; the friction disc 37 of the spool 12 slips while maintaining the clip 27 against the finger 119 and the lever 34, now liberated, positions the clip 27 by pushing it by means of its heel 116 against the lever 39 which abuts against 39'. The clip 27 is thus immobilised in a very precise position so that the clip transfer means can catch it.

As a result of its rocking, the lever 39 actuates the switch 40 which starts up the motor 41 (FIG. 7) for controlling the transfer means.

These transfer means comprise (FIGURES 7 and 12) a transfer arm 13 mounted to rotate on a shaft 43 which is mounted to rotate in a boss 124 carried by the frame K. This shaft 43 is fixed to a disc 125 formed with an opening 126 into which projects a lug 127 fixed to a pinion 42. A spring 128 connects the lug 127 to a lug 129 carried by the disc 125.

Two cams 57 and 59 are fixed to the pinion 42 and project beyond the periphery of the pinion.

A cam 44 having a boss 44′ and a lug 48 is fixed to the shaft 43.

The transfer arm has at one of its ends a rocking lever 51 loaded by a spring 52 and having a fork 51′ in which is disposed a lug 53′ of a pin 53 provided with a leaf spring 54. The lever 51 is counter-held by a push-rod 50 sliding in bearings 50′ fixed to the arm 13.

A spring 47 fixed between the end 49 of the arm 13 and a lug 45 fixed to the cam 44 maintains the arm 13 in the waiting position against a stop 46 carried by the frame K.

Preferably, this stop has a micrometric adjustment.

The switch 40 actuated by the lever 39 when the spool 12 is blocked starts the motor 41 which, through a reduction gear, drives the pinion 42 which, through its lug 127, the spring 128 and the lug 129 mounted on the disc 125, drives that disc 125 and therefore the shaft 43 fixed to the disc 125 and the cam 44 which is fixed to the shaft 43.

The boss 44′ of the cam 44 actuates the push-rod 50 which allows the lever 51, biassed by the spring 22, to lower the pin 53 which engages in a bore 31 formed in the clip 27, the spring 54 ensuring fixing of the said clip 27 to the pin 53.

The cam 44 continues its rotation and its lug 48 is caused to abut against the extension 49 of the arm 13, which set the latter in motion.

The take-up spool 9 which during the preceding projection cycle was held by a latch 55′ engaged in the notch 114 as will be described in detail further on, is immobilised in a pre-determined position, the sleeve 104 still being driven by the belt 1″ and the cheek 66 slipping on the friction disc 107.

The arm 13 pulls on the clip 27 through the bore 31 which causes first the projections 29 and then the projections 28 to be disengaged from the grooves 26.

The arm 13 pivots and thus unwinds the film and causes the spool 12 to turn in the clockwise direction, that is to say, causes slipping of the friction disc 37 which tends to drive the spool in the counterclockwise direction, the spool being free to turn because its blocking by the arms 116 and 119 to the clip has become inoperative.

The arm 13 continues its rotation and brings the slip 27 to the centre of the take-up spool 9 which is held in the waiting position by the latch 55′.

When the arm is in such a position that the pin 53 is exactly at the centre of the spool, it is immobilised by a stop 56 placed on the frame K.

Preferably, the stop 56 is in the form of a micrometric screw which allows the angular position of the transfer arm to be adjusted with precision.

The shaft 43 continues its rotation the lug 127 sliding in the curved slot 126 and tensioning the spring 128 until the cam 57 fixed to the pinion 42 stops the motor by acting on the switch 58 carried by the frame K.

In most automatic devices, the supply and take-up spools when in movement are driven at a speed close to the projection speed as soon as the end of the film is placed on the take-up spool; that causes sudden tensioning of the film which, in time, leads to breakage of the lead-in of the film or of the film itself.

To obviate this serious fault, the device in accordance with the invention comprises auxiliary means for driving the supply and take-up spools through which the take-up spool is driven at low speed during a pre-determined number of turns allowing a dead turn to be wound on to its barrel at the beginning of the projection operation, and is driven in the opposite direction at the end of the rewinding operation for unwinding that dead turn, the supply spool being driven in the direction opposite to the projection directed at the end of the projection operation by auxiliary means combined with the auxiliary means for driving the take-up spool.

The auxiliary means for driving the supply spool comprise a roller 131 disposed on a spindle 132 mounted to rotate in a boss 133 on the frame K (FIG. 8), this spindle comprising a pulley 134 in which engages a belt 135 passing round another pulley 99 fixed to the pulley 36; the roller 131 is thus driven by the driving pulley 1 through belts 1′ and 135.

On a fixed spindle 136 carried by the frame K are mounted for rotation on the one hand a cranked lever 137 and on the other hand a simple lever 85. The cranked lever 137 has at one of its ends a lug 138 and at the other end a pin 139 on which is mounted for rotation a movable arm 140 carrying at its end a pin 141 on which is mounted for rotation a swedging roller 14, this roller being preferably of a flexible material such as rubber. The movable arm 140 is subjected to the action of a return spring 142 fixed to the frame K. The simple lever 85 has a finger 187 and is subjected to the action of a return spring 188. When the lever 85 is liberated it rocks in the counterclockwise direction and, through the lug 138, drives the cranked lever 137 which drives the movable arm 140 while tensioning the spring 142. On the other hand, when the lever 85 is moved aside, by means which will be described further on, the return spring 142 attracts the roller 14 and brings it into contact both with the roller 131 and the edge 96a of the plate 96 on which rests the supply spool 12. Because of the direction of rotation of the roller 131, the roller 14 is wedged between the roller 131 and the edge 96a, the latter being also driven by the said roller 131. The dimensions of the rollers are designed so that the supply spool is driven during the re-winding at a speed 3 or 4 times greater than the speed at which it turns during projection.

The auxiliary driving means for the take-up spool 9 are duplicated so as to allow it to be driven slowly in the beginning of projection and end of re-winding direction.

These means are formed in the following manner given by way of non-limiting example. A group of levers 55, 71 and 65 is mounted for rotation on a common spindle 143 carried by the frame K.

The lever 55 comprises on the one hand the latch 55′ which is to enter the notch 114 in the spool 9 in order to immobilize it and on the other hand a substantially rectangular cut-out 144 and a branch 145 biased by a spring 146 fixed to the frame K.

The lever 71 is a simple lever pivotally mounted at one of its ends on the common spindle 143 and connected at its other end to a return spring 153 anchored to a pin 159 and has a projecting pin 154.

The lever 65 is a lever with three arms 147, 148, 149, pivotally mounted on the common spindle 143 practically at the point of convergence of its three branches. The branch 147 has at its end a return tension spring 150 and has a pin 155 on which is mounted for rotation a pawl 63 having a shoulder against which rests the pin 154 of the lever 71, and a boss 157 to which is fixed one of the ends of a return spring 158 of which the other end is fixed to the said branch 147. The branch 148 has at its end a pin 151 projecting from both faces of that branch 148, the upper part of the said pin 151 supporting a rocking cranked lever 61 and the lower part of this pin projecting into the rectangular cut-out 144 of the lever 55; the branch 149 bears against a pin 152 at one of the ends of a lever 62.

This lever 62 (FIG. 9) mounted freely on a spindle 160 driven by a pulley 161, a belt 162 and a pulley 163 fixed to the pulley 106 which is itself driven by the driving pulley 1 has at one of its ends a lug 164 and at the other end the pin 152 on which is freely mounted a movable arm 11 on the end of which is mounted for rotation a wedging roller 90, the movable arm 11 being biased by a spring 165 through which the said roller 90 is maintained in contact with a driving roller 166 fixed to the spindle 160. The lug 164 of the lever 62 rests in a notch 167 formed in a lever 168 pivotally mounted on a pin 169.

A second wedging roller 64, which, like the roller 90 and the roller 14 is preferably of a flexible material such as rubber is carried by a movable arm 10 which is pivotally mounted on a pin 170 carried by a lever 171 mounted freely to pivot on a pin 172. The end of this lever 171 rests against the lug 159 carried by the lever 71.

The pin 172 mounted for rotation in a boss 173 of the frame K has at its lower end a pulley 174 receiving a belt 175 driven by a pulley 176 fixed to the pulley 106. On this pin 172 is keyed a driving roller 177 which is therefore driven by the driving pulley 1.

The ratios of the diameters of the pulleys 176–163 and 174–161 and of the roller 177–166 and the cheek 66 of the spool 9 are such that when one or the other of the rollers 64 and 90, driven by the driving rollers 177–166 comes into contact with the edge of the cheek 66, the spool 9 is driven at reduced speed.

On the pin 169 is mounted also a rocker 88 having a lug 178 and coacting with a push-rod 87 the role of which will be explained further on.

When the arm 13 arrives against the stop 56, the lug 179 carried by this arm 13 catches a finger formed on the lever 61 and drives that lever.

As this lever 61 is mounted on the branch 148 of the lever 65 on the pin 151, it drives this branch, which leads to pivoting in the clockwise direction of the said lever 65 about its pivot pin 143.

The lower part of the pin 151 strikes the right-hand side of the cut-out 144 in the lever 55, which causes the lever 55 also to pivot on its pin 143, this pivoting disengaging the latch 55' from the notch 114 formed in the cheek 66 of the spool 9, which liberates the supply spool.

Simultaneously, as the lever 65 has pivoted, its branch 147 drops while tensioning the spring 150 and the pawl 63 bears against the lug 154 through its shoulder 156, which causes the lever 71 to rock and to tension the spring 153.

As the lever 171 is no longer held back by the lug 159 of the lever 71, it rocks under the influence of a spring 180 fixed between the frame K and the lever 10 carrying the roller 64, the effect of which is that the roller 64 is presented between the edge of the cheek 66 and the driving roller 171.

As the roller 171 is driven in the clockwise direction, the roller 64 is wedged between the cheek 66 and the driving roller 171, the effect of which is that the cheek 66 is driven at slow speed in the counterclockwise direction.

The spool 9 thus turns at slow speed until the tongue 68 which passes through a perforation in the first wound turn of the film or its lead-in has been eliminated by a part of the film having no perforations and causes the bar 69 to project and to catch the end of the pawl 63 (FIG. 14) and cause it to rock thereby liberating the lever 71 urged by the spring 72.

In rocking, the lever 71, through its lug 159, catches the end of the lever 171 which causes the latter to pivot in the direction opposite to the clockwise direction, during which rocking movement the wedging roller 64 is put out of contact with the cheek 66 of the spool 9.

Simultaneously, the lever 71 acts on the contact 73 which stops the projection motor and starts up the means for presenting the film to the projection and sound reading.

On the other hand, when at the end of the rewinding operation which will be described in detail further on, the tongue 68 of the take-up spool passes through the opening formed at the end of the film or its lead-in, the bar 69' projects from the side of the cheek 66 and strikes the tail of the lever 61 (FIG. 15), which causes it to rock on its pin 151 while disengaging it from the lug 179 of the arm 13. The lever 61 under the influence of a return spring 67 fixed to the branch 149 of the lever 65 comes to rest in the waiting position against a stop 181 carried by that lever 65.

Under the action of the spring 150, the lever 65 rocks in the counterclockwise direction; the pin 151 carried by the branch 148 of the said lever 65 bears on the rocker 88 and causes it to turn on its pivot 169. The rocker 88 pushes back the push-rod 87 which, as will be described further on, causes the rewinding drive to be de-clutched. The rocker 88 continues its movement and its lug 178 catches the lever 168 and causes it to pivot about its common pivot pin 169. The shoulder 167 of the lever 168 liberates the lug 164 of the lever 62.

The branch 149 of the lever 65 which was holding the lever 63 through the end of the pin 152, liberates it because of the rocking of the lever 65. The spring 165 pulls back the lever 62 which pivots in the clockwise direction and the wedging roller 90 is presented between the driving roller 166 and the edge of the cheek 66 of the spool 9. As the driving roller 166 turns in the clockwise direction, the roller 90 is wedged between the roller 166 and the cheek 66 and transmits to that cheek the movement of the roller 166. The spool then turns at a slow speed in the clockwise direction.

As the lever 55 is no longer held by the lower part of the pin 151, it is brought back by the spring 146 and the latch 55' falls on to the edge of the cheek 66 where it awaits the notch 114.

When the latch 55' drops into the notch 114, the lever 55 pivots again in the counterclockwise direction under the action of the spring 146 and its branch 145 presses on the lug 164 of the lever 62 and causes it to rock by disengaging the roller 60 from the cheek 66. In continuing to move, the branch 145 of the lever 55 comes into pressing engagement with the switch 92.

The push-rod 87, guided by one or more bearings 183 is counter-held by a spring 184 which maintains it in contact with the end of a lever 86 pivotally mounted on a pin 185 carried by an arm 5 fixed to a shaft 6.

This shaft 6 is fixed to a toothed sector 75 meshing with a reducing pinion actuated by a motor 74; this motor 74 is reversible and thus oscillates the arm 5 in one or other direction as required.

This movable arm 5 carries the winding rollers 76 mounted idly on their spindles and when it is moved it is moved by the motor 74 in the direction indicated by the arrow f2, it brings the film; tensioned between the two spools 9 and 12 in contact with the toothed driver 4 carried by the frame K and driven by the projection motor in contact with the image passage 2 and the sound reader 3.

By way of information, the positions of the rollers 76 are shown dotted in the projection position, the film gripped between the winding rollers 76 carried by the movable arm 5 and similar winding rollers 76' carried by the frame K.

A fixed stop 80 limits the stroke of the movable arm 5 in the projection position and the lever 81 closes the contact 82, stopping the motor 74 and starting the projection.

The lever 86 carried by the movable arm 5 has a shoulder 186. The lever 86 acts on the lever 85 through that shoulder.

The apparatus thus described operates as follows:

A supply spool carrying the film to be projected is placed on the spindle 33. The end of the film is engaged in a clip 27. There is no attempt to arrange the clip in any particular position.

The lever 34 is actuated in the direction of the arrow f1 until the switch 35 is actuated. The lever 34 comes back into position under the action of the spring 120 by being held by the lever 39 (FIG. 10).

The switch 35 starts up the projection motor which drives the pulley 1 and the two spools 12 and 9 in the clockwise direction (FIGURES 8 and 9).

The rotation of the spool 12 causes the clip 27 to rock the lever 39 which liberates the lever 34 and immobilizes the spool 12, the friction drive 37 slipping, and actuates the switch 40 which starts up the motor 41.

The cam 44 is set in movement as described above and the pin 53 enters the bore of the clip 27 (FIG. 12).

The transfer arm 13 is set in movement. It detaches the clip 37 from the cheeks 24 and 25 of the spool 12 and the tape removal causes rotation of the spool 12 in the counterclockwise direction.

During the previous use of the apparatus, the spool 9 was turned until the latch 55′ entered the notch 114 and immoblized it in a predetermined position such that the clip 27 carried by the arm 13 could enter the space 111 and arrive at the center of the spool.

The arm 13 abuts against the fixed stop 56 and the cam 57, fixed to the pinion 42, stops the motor by acting on the contact 58.

The lug 179 carried by the arm 13 catches the lever 61 and drives it (FIG. 13) causing the levers 55, 65 and 71 to rock in the clockwise direction, the effect of which is, as has been described above, to unlatch the spool 9 and to cause it to be driven at slow speed in counter-clockwise or winding direction by the driving roller 177 and the wedging roller 64.

The spool turns at slow speed winding the film on to its barrel 110 (FIG. 9) until the tongue 68 which passes through a perforation in the lead-in part of the film at the first turn is made ineffective and causes the bar 69 to project and to rock the pawl 63 through which the roller 64 was maintained in contact with the cheek 66 of the spool 9.

The rocking of the pawl 63 results, as was explained above, in the liberation of the lever 71 which acts on the switch 73 which stops the projection motor and controls the motor 74 of the mobile arm 5.

Under the action of the motor 74, the movable arm 5 is displaced in the direction of the arrow f2 (FIG. 7) and jams the film between the fixed rollers 76′ and movable rollers 76 carried by the said movable arm 5 so that the film is applied to the toothed film driver 4, the image passage 2 and the sound reading cell 3.

The movement of the movable arm 5 is stopped by the fixed stop 80 and the motor continues to turn until the lever 81 actuated by the said motor 74 acts on the contact 82, opening the circuit of the motor 74 and starting the projection.

The projection motor causes the toothed film driver 4 to rotate which ensures movement of the film and the spools 9 and 12 through their friction clutches 37 and 107 (FIGS. 8, 9, and 14) the spool 9 being driven in the film winding direction which maintains it tensioned.

At the end of the projection, the tongue 21 of the supply spool (FIGS. 4 and 8) enters the perforations formed in the last turns of film and the bar 22 meets the lever 23 (FIG. 7) which rocks the contact 83.

The contact 83 starts up the motor 74 in the direction opposite to the preceding direction, the movable arm 5 is displaced in the direction opposite to that of the arrow f2 and the film, being no longer progressed by the driver 4, stops.

As the spools 12 and 9 are still under the influence of their friction clutches, they take up the loops of film.

At the end of the opening, the movable arm pushes back the lever 86 the shoulder 186 of which carries with it the lug 187 of the lever 85 which, as has been explained above, allows the roller 14 to come into contact with the edge 96a of the plate 96 on which rests the supply spool 12.

The supply spool 12 is therefore positively controlled by the driving roller 131 and through the roller 14 in the direction opposite to that of projection. The take-up spool 9, driven by the film, turns in the direction opposite to that of projection, its clutch 107 slipping, and the film is rewound on the supply spool 12.

At the end of the rewinding, the tongue 68 of the spool 9 (FIGS. 7, 9 and 15) passes through the perforation in the end of the first wound turn of the lead-in part of the film on the barrel 110 and the bar 69′ strikes the tail of the lever 61.

Simultaneously, as has been described above in detail, the lever 61 disengages from the lug 179 of the arm 13 and comes back into the waiting position. The lever 65 rocks which leads to rotation of the rocker 88 which acts on the push-rod 87 which rotates the pawl 86 which in turn liberates the lever 85 which disengages the roller 14 from the edge 96a of the plate 96 and stops the rewinding (FIG. 7). The lever 62 carrying the rollers 90 and 166 lowers, the roller 90 coming into contact with the cheek 66 of the take-up spool 9, the latter being then driven at slow speed in the rewinding direction to unwind the dead turn of the lead-in part of the film from the barrel 10 (FIG. 15). The latch 55′ is placed in the waiting position along the edge of the cheek 66 of the spool 9.

When the latch 55′ enters the notch 114 of the spool 9, the latter is immobilized, the film, the clip, the space 111 and the arm 13 are in exactly the same relative positions as they occupied at the instant of loading the film.

By entering the notch 114, the latch 55′ allows the lever 55 to lower a little more which leads to disengagement of the roller 90 and closing of the switch 92.

The switch 92 causes the motor 41 to start up in the opposite direction to that in which it turned at the time of the first movement of the transfer arm 13 and the latter causes rotation in the opposite direction. The spool 12 turns always in the counterclockwise direction which keeps the film tensioned during the transfer.

The arm 13 engages the clip between one of the rolling rollers carried by the frame K and an appropriate guide ramp 189 so that the grippers 28 of the clip 27 are forcibly engaged between the cheeks 24 and 25. Under the effect of the rotation of the spool 12, the clip rocks and the grippers 29 are in their turn engaged in the groove 26.

The arm 13 is stopped by the stop 46. The shaft 43 continues to rotate. The cam 44, through the push rod 50 (FIG. 12) causes the needle 53 to rise which liberates the clip.

The cam 59 which is fixed to the pinion 42 stops the motor 41 and the projection motor by acting on the contact 60.

What is claimed is:

1. In a device for automatically transferring the end of a tape from a supply spool to a take-up spool, winding said tape on the take-up spool during recording or reproducing of information on said tape, rewinding the tape on the supply spool and restoring the tape end to the supply spool, the combination comprising, a rotatably mounted supply spool having a barrel and radially extending cheeks fixed thereto, means fixing one end of a tape to said barrel, a clip adapted to have the other end of said tape fixed thereto, cooperating means on said clip and reel cheeks for removably fixing said clip to said cheeks, transfer means for engaging said clip and removing said clip from said spool cheeks and transporting it to a position to cause winding of said tape on said take-up spool during rotation thereof, means for driving said tape, means for driving said take-up spool to wind tape thereon during drive by said tape driving means past a transducer station, means for rewinding said tape on said supply spool and means comprising said transfer means for restoring said clip to said supply spool cheeks during the terminal portion of said rewinding operation.

2. A device as claimed in claim 1 wherein said cooperating means for removably fixing said clip to said supply spool cheeks comprises circumferential grooves on said spool cheeks and projections on said clip engaging said cheek grooves.

3. A device as claimed in claim 1 including means for frictionally rotating said supply spool in a direction normally tending to unwind tape therefrom, stop means cooperating with said clip to stop said spool with said clip in a predetermined position for engagement by said engaging means of said tranfer means.

4. A device as claimed in claim 3 wherein the take-up spool comprises a barrel and two radially extending cheeks fixed thereto, one of said cheeks having a radial notch thereon extending substantially to the center thereof and wherein said transfer means transports said clip and tape end through said notch and holds said tape end while said take-up spool rotates to thereby wind said tape on said take-up spool barrel.

5. A device as claimed in claim 1 including friction means to drive said supply spool and said take-up spool in directions to wind tape on the respective barrels, first auxiliary drive means for driving said take-up spool at low speed during a predetermined number of revolutions to wind the tape end on the barrel of said take-up spool, second auxiliary drive means to drive said supply spool at increased speed to rewind tape thereon following completion of its passage through said transducing station and third auxiliary means driving said take-up spool at low speed during said predetermined number of revolutions in a direction to unwind the tape end therefrom, said friction drive maintaining said tape under tension during said slow speed unwinding from said take-up spool.

6. A device as claimed in claim 3 wherein said clip engaging means comprises a pin on said transfer means, said clip having an aperture to receive said clip, said pin and aperture being in alignment when said supply reel is stopped by said stop means and means are provided for actuating said pin to enter said aperture.

7. A device as claimed in claim 5 wrerein each of said first, second and third auxiliary drive means comprises driven rollers, wedging rollers driven by said driven rollers and pivotally mounted arms mounting said wedging rollers to move said wedging rollers into and out of engagement with a cheek of the cooperating spool and including control means for pivoting said arms at predetermined times.

8. A device as claimed in claim 7 wherein said control means for said first auxiliary drive pivotal arm comprises means actuated by said transfer means as said clip reaches position at the center of said take-up spool, to engage said respective roller, means comprising a trip arm slidably mounted on said take-up spool and having a projection extending through holes on the tape end and cooperating means for pivoting the respective wedging roller arm to disengage said respective wedging roller when said tape end has been wound, said control means for said second pivotal arm comprising means operable when the tape has passed through the transducing station to pivot said arm and engage said respective wedging roller and trip means operable when said tape end turns only remain on said take-up reel to pivot said arm and disengage said second wedging roller, and said third auxiliary drive pivotal arm control means comprises a trip member slidably mounted on said take-up spool to cause said third pivot arm to be activated to move the respective third wedging roller into contact with said take-up spool cheek, said third drive pivotal arm control means also including means operable as said take-up spool attains its initial position to remove said third wedging roller from contact with said take-up spool cheek.

References Cited

UNITED STATES PATENTS

| | | | |
|---|---|---|---|
| 1,933,659 | 11/1933 | Curran | 242—74 X |
| 2,964,593 | 12/1960 | Kleve | 242—55.12 X |
| 3,100,090 | 8/1963 | Goodell et al. | 242—55.13 |
| 3,239,157 | 3/1966 | Doncaster et al. | 242—55.13 |
| 3,254,856 | 6/1966 | Camras | 242—55.13 |

FRANK J. COHEN, *Primary Examiner.*

G. F. MAUTZ, *Assistant Examiner.*